3,618,358
CONTINUOUS SELF-TEST INERTIAL APPARATUS
John C. Dendy, Phoenix, and Carl D. Griffith and Everett R. Tribken, Scottsdale, Ariz., assignors to Sperry Rand Corporation
Filed Dec. 30, 1968, Ser. No. 787,890
Int. Cl. G01c 25/00
U.S. Cl. 73—1
9 Claims

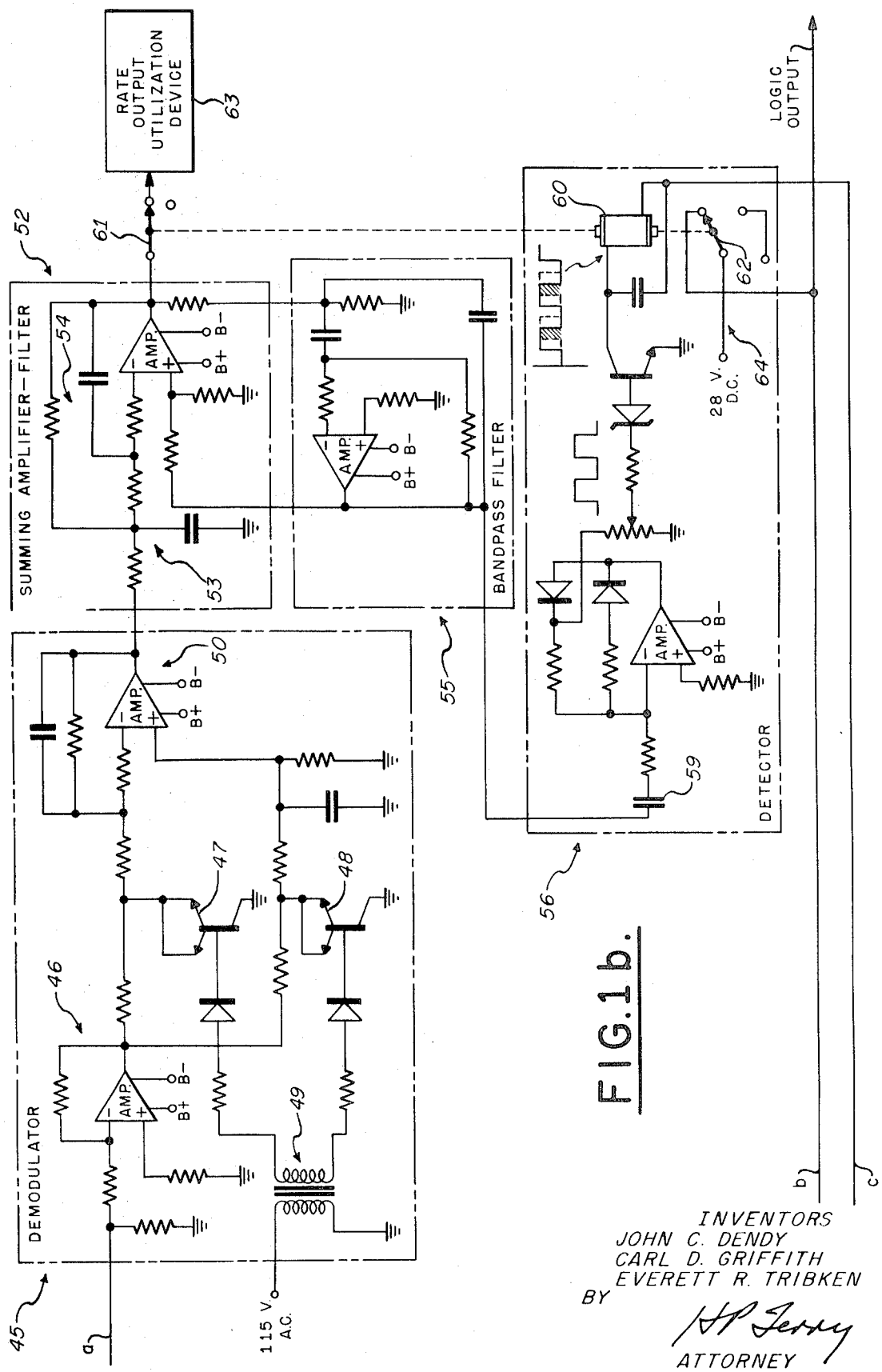

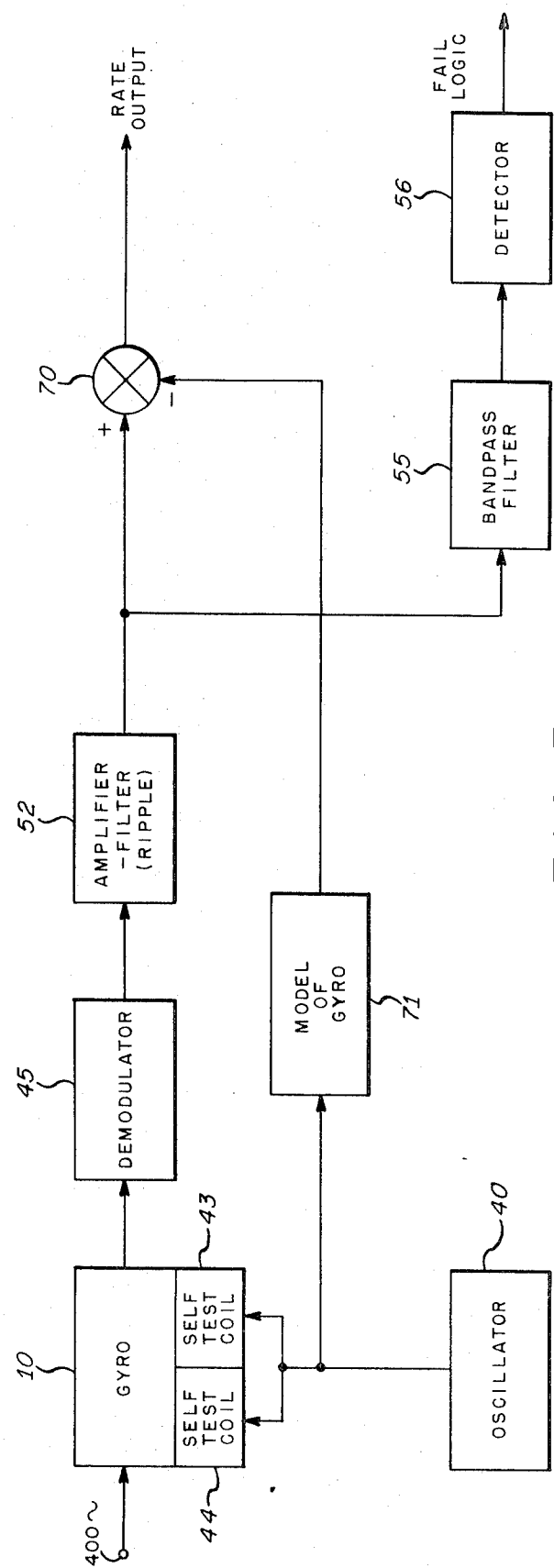
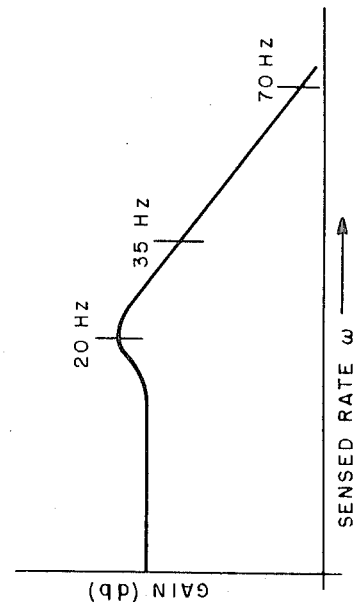
FIG. 2.
FIG. 3.
INVENTORS
JOHN C. DENDY
CARL D. GRIFFITH
EVERETT R. TRIBKEN
BY
*H P Terry*
ATTORNEY United States Patent Office 3,618,358
Patented Nov. 9, 1971

ABSTRACT OF THE DISCLOSURE

Continuous self-test apparatus for inertial devices having a sensitive element wherein the sensitive element is continuously exercised to provide a composite signal representative of the effects of exercising the sensitive element and the normal operation of the device in which the output signal is representative of the normal operation of the device.

BACKGROUND OF THE INVENTION

(1) Field of the invention

The present invention pertains to monitoring or testing devices for continuously testing the operation of inertial devices and equipment associated therewith.

(2) Description of the prior art

In automatic control systems particularly of the type adapted for use in aircraft there is a continuing effort to provide fail operational and failsafe systems in order that the control function may be continued by an alternative system or at the least avoid any substantial change in the control of the aircraft due to failure of the component. In aircraft, failsafe control is normally achieved by the use of dual redundant control channels having a total complexity substantially greater than that of one continuous self-test channel. It will also be appreciated that in the event of failure of one of two identical channels there is no way to determine which of the two channels is providing the accurate desired signal. Thus, the fail operational design of past practice has required the use of triple-redundant control channels with the obvious increase in complexity and cost.

Other prior art monitoring devices are inadequate because they either test intermittently or they do not provide complete testing of the operational device and its associated components.

SUMMARY OF THE INVENTION

The present invention provides for continuous self-test of the inertial device and its associated components. The inertial device usually has a sensitive element responsive to normal operation of the craft on which it is mounted for providing an output signal in response thereto. The present invention continuously exercises the sensitive element of the inertial device in a range other than that in which the sensitive element is normally intended to operate whereby the inertial device provides a composite signal representative of the effects of being exercised as well as that of its normal operation. That portion of the composite signal due to exercising the sensitive element is rendered ineffective such that the output control signal is substantially the same as it would have been without the effects of the aforementioned exercising. A further signal is provided that is representative of the continuous monitoring of the inertial device and its associated components thereby providing a failsafe system which requires a single control channel and a fail operational system that requires only two control channels.

BRIEF DESCRIPTION OF THE DRAWINGS

FIGS. 1a and 1b are a schematic representation of the present invention being utilized with a rate gyroscope;

FIG. 2 is a graph showing the response characteristics of a typical rate gyroscope in terms of gain in db versus gyro sensed rate $\omega$; and FIG. 3 is a schematic representation in block form of an alternative embodiment of the present invention using a model technique.

DESCRIPTION OF THE PREFERRED EMBODIMENT

A preferred embodiment of the present invention will now be described with respect to a gyroscopic inertial device although it will be appreciated that the present invention is equally applicable to accelerometers and other types of inertial devices.

Figure 1A:
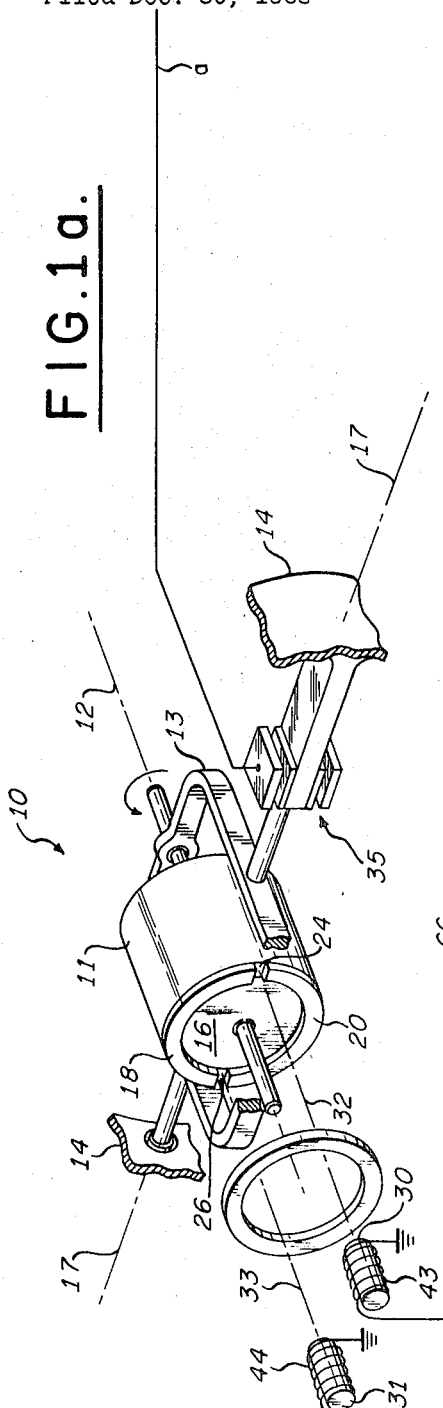
Figure 1A:
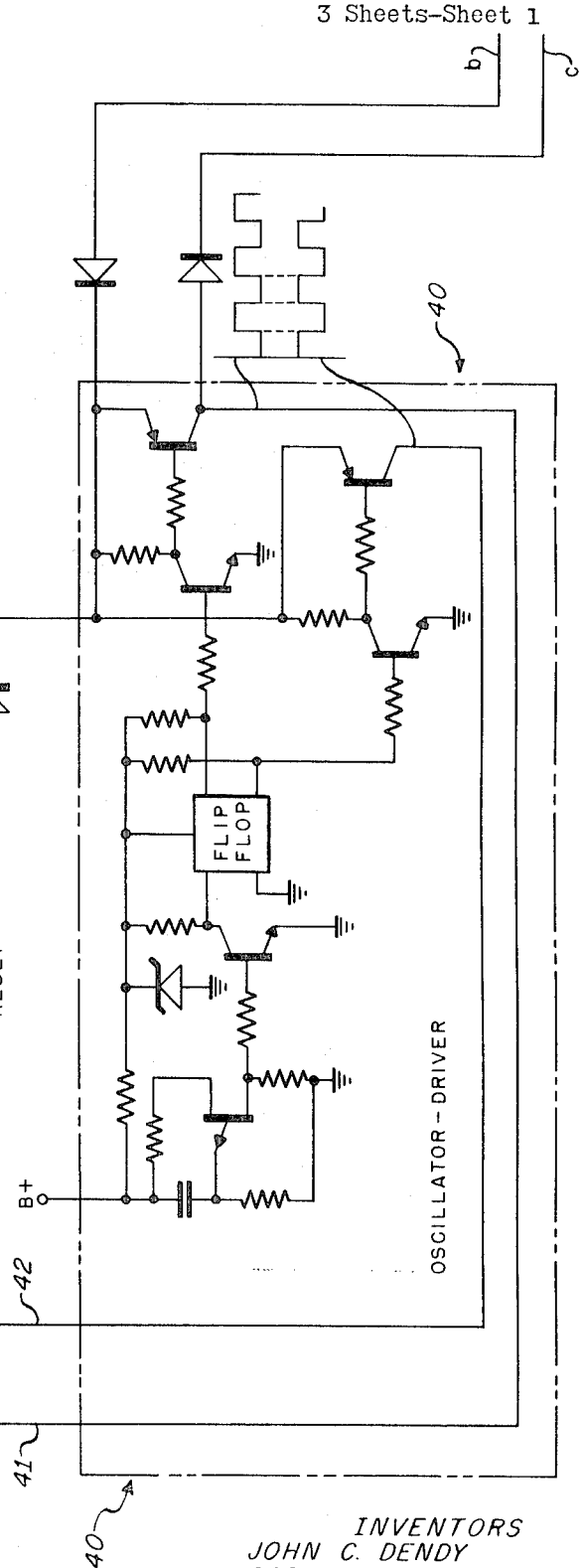

Referring now to FIG. 1, a rate gyroscope 10 is shown having a gyroscopic rotor 11 mounted for rotation about a spin axis 12 by means of a gimbal 13. The gimbal 13 is mounted for rotation within a gyro case 14 against the resilient restraint of a torsion bar 15 about an axis 17 in a conventional manner.

The end face 16 of the gyro rotor 11 has two accurate shaped semi-rounds 18 and 20 of magnetic material secured thereto in spaced relation to provide spaces 24 and 26 therebetween. A ring 28 of conductive material is then overlayed adjacent the magnetic semi-rounds 18 and 20 in a manner more fully described in U.S. Pat. No. 3,186,211 entitled "Self-Checking Gyroscopic Apparatus" of C. B. Reed et al., issued June 1, 1965 and assigned to the same assignee as the present invention.

Two electromagnets 30 and 31 are aligned with their respective axes coincident with parallel axes 32 and 33 and are secured to the gyro case 14. The electromagnets 30 and 31 are cooperative with the ring 28 and semi-rounds 18 and 20 for applying a torque to the gyro rotor 11. When the electromagnet 30 is excited, the gimbal 13 is caused to rotate about its axis 17 in a particular direction depending upon the direction of rotation of the gyro rotor 11, assuming that the gyro rotor 11 is spinning. Alternatively, when the electromagnet 31 is excited under the same conditions, the gimbal 12 is caused to rotate about its axis 17 in an opposite direction in a manner described in said U.S. Patent No. 3,186,211. The direction and magnitude of the rotation of the gimbal 13 is sensed by a conventional pick-off 35.

To provide for continuous self-test operation in accordance with the present invention, an oscillator driver circuit 40 has its output leads 41 and 42 connected to the respective windings 43 and 44 of the electromagnets 30 and 31. The oscillator driver circuit 40 is a conventional unijunction relaxation oscillator which provides a dither signal in the form of alternating square wave pulses to the self-test windings 43 and 44 at a frequency in excess of the normal operating range of the rate gyro 10, e.g., 35 Hz. and at an amplitude of approximately 1% of the total gyro range.

The pick-off 35 is connected to a demodulator 45 which may include an input operational amplifier 46 and a pair of dual emitter transistors 47 and 48, the latter being responsive to a reference A.C. source 49 for providing positive and negative going half waves. The positive and negative going half waves of the A.C. source 49 are summed in an output operational amplifier 50 to provide a D.C. signal to a summing amplifier and filter circuit 52. The summing amplifier and filter circuit 52 includes RC circuits 53 and 54 in its forward and feedback paths respectively for eliminating any ripple on the signal from the demodulator 45. The output of the amplifier 52 is connected to a bandpass filter 55 which is sharply tuned to the 35 Hz. dither signal to exhibit a very high gain at 35 Hz. The output of the filter 55 is connected in feedback fashion to an input of the summing amplifier 52 in opposed relation to the other input of the amplifier 52.

The output of the bandpass filter 55 is also connected to a detector 56 via a D.C. isolating capacitor 57. The detector 56 in turn is connected to a relay 60. The relay 60 controls the contact arms 61 and 62. The relay 60 is also responsive to one polarity pulse train from the oscillator driver 40. The contact arm 61 is normally closed to connect the output of the summing amplifier filter 52 to a rate output utilization device 63. The contact arm 62 normally connects a 28 volt D.C. source 64 to provide a logic output for monitoring purposes to provide a positive indication of the validity of the rate signal.

In operation, as the aircraft on which the rate gyro 10 is mounted maneuvers, the rate gyro 10 will respond in a normal manner to provide a rate signal from the pick-off 35 representative of the magnitude and direction of the rate of the aircraft maneuver. Superimposed on the normal operation of the rate gyro 10 is a continuous self-test dither signal comprising alternating square wave pulses from the oscillator driver 40 to the self-test coils 43 and 44, respectively, which cause the gyro rotor 11 to dither at a 35 Hz. cycle. The output signal from the pick-off 35 is thus a composite signal representative of the effects of exercising the gyro rotor 11 by virtue of the 35 Hz. continuous test signal and the normal response of the gyro 10 to the aircraft maneuvers. The demodulator 45 provides at its output a D.C. signal proportional to the sum of the gyro measured rate signal and the 35 Hz. dither signal which is amplified and filtered in the summing amplifier and filter 52 and filtered in the sharply tuned bandpass filter 55 to provide a very high gain at 35 Hz. The output of the filter 55 when fed back in opposing relation to the input of the amplifier 52 maintains the 35 Hz. test signal at a very low although finite value at the output of the amplifier 52. In practice, the amplitude of the test signal is thus reduced to insignificance by the aforementioned feedback technique while continuously monitoring both the summing amplifier 52 and the bandpass filter 55.

The high gain 35 Hz. signal from the filter 55 is half wave demodulated and converted to a single polarity pulse train in the detector 56 for maintaining the relay 60 in an energized condition as long as the pulse train continues thereby providing a positive logic output signal via D.C. source 64 when the rate signal is valid.

The relay 60 is also responsive to a pulse train of a particular polarity from the oscillator driver 40 with the difference in the phase of the detector output and that of the oscillator output always underlapping such that the delay of the 35 Hz. test signal through the gyro demodulator filter combination does not exceed a pulse width thereby providing a further phase discrimination monitoring function.

In the event of a detected failure, although the fault may have subsequently been cleared, the relay 60 will drop out thereby disconnecting both the rate and logic output signals and remain in that condition until a D.C. reset voltage is applied to the oscillator 40 via a reset switch 65 connected to a D.C. source 66.

The present invention thus provides continuous exercising of the gyro 10 and continuous testing of the proper operation of the gyro 10 including gyro rotor rotation as well as all of the aforementioned components associated with the gyro 10.

The choice of the test signal applied to the rate gyro 10 is based on the second order frequency response characteristics of the gyro 10 as shown in the graph of FIG. 2. It will be appreciated that the higher the frequency of the test signal, the more difficult it is to detect at the gyro output. On the other hand, it must be outside the normal operating frequencies encountered in the particular operation to which the gyro is subjected, i.e., aircraft maneuvers in this instance. The relatively low 35 Hz. frequency is closer to the peak response of the gyro 10 but outside the normal maneuver frequencies experienced by the aircraft.

Referring now to FIG. 3, an alternative continuous self-test apparatus is shown utilizing a model technique. One advantage is that the test signal is completely eliminated in the rate output signal. For purposes of simplicity, like reference characters will be applied to like elements. An oscillator 40 is connected to provide a continuous test signal consisting of alternate pulses to the self-test windings 43 and 44 of the gyro 10. The output of the gyro 10 is connected to a demodulator 45 and an amplifier filter 52 which in turn has its output connected to an input terminal of an algebraic summation device 70. The output of the oscillator 40 is also connected to a circuit 71 representing a model of the gyro 10, demodulator 45 and amplifier 52 such that the model transfer function provides an output signal equal and opposite to that provided by virtue of the oscillator test signal at the input of the algebraic summation device 70. The output of the model circuit 71 is connected to another input terminal of the algebraic summation device 70 in opposition to the signal appearing from the amplifier 52 thereby providing in actual operation essentially complete subtraction of the test signal. Thus the output of the algebraic summation device 70 is a rate signal representative of the maneuvers of the aircraft on which the gyro 10 is mounted. The output of the amplifier filter 52 is connected to a bandpass filter 55 and a detector 56 to provide a monitoring logic signal in a manner similar to that described previously with respect to FIG. 1.

The detector 56 detects the presence of the self-test oscillator signal and in normal operation with both the gyro 10 and the oscillator 40 functioning properly a signal is detected indicating proper operation. If either the oscillator 40, gyro 10, demodulator 45, or amplifier 52 fail, either passively or into saturation, a signal will appear at the detector 56 to register a failure and initiate the necessary action to open the signal paths at the rate output insuring failsafe operation.

Alternatively, the detector 56 may be arranged to be responsive to the output of the algebraic summation device 70 in lieu of the arrangement shown in FIG. 3 to provide monitoring of the model circuit 71 also. However, then the detector 56 becomes a null detector as far as the test signal is concerned and the oscillator 40 is not monitored. Normally, it is preferable to monitor the oscillator 40 rather than the model 71 since the model 71 generally contains relatively few circuit components and is more reliable than the oscillator 40.

Another alternative is a combination of the filter technique shown in FIG. 1 and the model technique shown in FIG. 3 where the output of the model circuit 71 of FIG. 3 is summed with the output of the feedback amplifier 52 of FIG. 1 to remove the small but finite test signal from the rate output.

In certain applications it may be desirable to eliminate the small amount of test signal in the rate output. In the normal control system application for aircraft, it is not necessary to completely eliminate the test signal since as explained above it is rendered ineffective. However, if, for example, the rate output signal were applied to a cathode ray tube type of rate of turn indicator, a flicker might result and thus it is preferable in those applications to utilize a continuous self-test system which completely eliminates the test signal in the rate output.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. Continuous self-test apparatus for inertial devices having a sensitive element comprising
   means for mechanically exercising said sensitive element in a range other than that which said sensitive element is normally intended to operate for providing a composite signal representative of the effects of said exercising and said normal operation,
   means for detecting that portion of said composite signal representative of the effects of said exercising, and
   means for rendering that portion of said composite signal representative of the effects of said exercising ineffective whereby the remaining portion of said composite signal effectively represents said normal operation.

2. Apparatus of the character recited in claim 1 in which said inertial device is an accelerometer having an inertial mass.

3. Apparatus of the character recited in claim 1 in which said last-mentioned means includes degenerative feedback connection means responsive to said composite signal for rendering that portion of said composite signal representative of the effects of said exercising ineffective.

4. Apparatus of the character recited in claim 3 wherein said degenerative feedback means includes bandpass filter means tuned to the normal frequency of said exercising component of said composite signal.

5. Apparatus of the character recited in claim 1 in which said last-mentioned means includes feed forward connection means responsive to said composite signal for rendering that portion of said composite signal representative of the effects of said exercising ineffective.

6. Apparatus of the character recited in claim 1 in which said last-mentioned means includes degenerative feedback connection means and feed forward connection means in combination responsive to said composite signal for rendering that portion of said composite signal representative of the effects of said exercising ineffective.

7. Apparatus of the character recited in claim 1 in which said last-mentioned means includes model circuit means responsive to said exercising means for providing a signal having a transfer function representative of the operation of said inertial device in response to said exercising means, and
   algebraic summation means responsive to that portion of said composite signal representative of the effects of said exercising and to said model circuit signal for providing essentially complete subtraction of one by means of the other.

8. Apparatus of the character recited in claim 1 in which said inertial device is a gyroscope having a spinning rotor as the sensitive element, and said means for exercising said sensitive element includes means responsive to the rotation speed of said spinning rotor.

9. Apparatus of the character recited in claim 8 in which said means responsive to the rotation speed of said spinning rotor includes first and second electromagnetic means in cooperative relation for torquing said rotor, and further including
   oscillator means coupled to said electromagnetic means for providing alternate pulses to said first and second electromagnetic means respectively for dithering said rotor,
   pick-off means responsive to said rotor for providing said composite signal, and
   said means for rendering that portion of said composite signal representative of the effects of said exercising ineffective includes feedback means responsive to said dithering for providing a degenerative feedback signal in accordance therewith.

References Cited

UNITED STATES PATENTS

| | | | |
|---|---|---|---|
| 2,782,405 | 2/1957 | Weisz et al. | 340—410 |
| 3,186,211 | 6/1965 | Reed et al. | 73—1 D |
| 3,394,581 | 7/1968 | Johnson | 73—1 A |
| 3,282,081 | 11/1966 | Boskovich | 73—1 D |

S. CLEMENT SWISHER, Primary Examiner